United States Patent
Reddy et al.

(10) Patent No.: US 12,443,348 B2
(45) Date of Patent: Oct. 14, 2025

(54) DATA STORAGE DEVICE AND METHOD FOR READ SCRUB WITH REDUCED READ AMPLIFICATION

(71) Applicant: Sandisk Technologies, Inc., Milpitas, CA (US)

(72) Inventors: Chappidi Sai Revanth Reddy, Andhra Pradesh (IN); Narendhiran Chinnaanangur Ravimohan, Bangalore (IN); Deepak Yadav, New Delhi (IN); Ankit Gupta, Uttar Pradesh (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/223,684

(22) Filed: Jul. 19, 2023

(65) Prior Publication Data
US 2024/0302972 A1    Sep. 12, 2024

Related U.S. Application Data

(60) Provisional application No. 63/450,422, filed on Mar. 7, 2023.

(51) Int. Cl.
    *G06F 3/06* (2006.01)
(52) U.S. Cl.
    CPC .......... *G06F 3/0616* (2013.01); *G06F 3/0652* (2013.01); *G06F 3/0653* (2013.01); *G06F 3/0673* (2013.01)

(58) Field of Classification Search
CPC .... G06F 3/0616; G06F 3/0652; G06F 3/0653; G06F 3/0673
See application file for complete search history.

(56) References Cited

U.S. PATENT DOCUMENTS

| | | | |
|---|---|---|---|
| 9,053,808 B2 | 6/2015 | Sprouse et al. | |
| 9,552,171 B2 | 1/2017 | Huang et al. | |
| 9,639,463 B1* | 5/2017 | Kankani | G06F 12/0261 |
| 11,204,827 B2 | 12/2021 | Borlick et al. | |
| 11,385,984 B2 | 7/2022 | Yang et al. | |
| 2006/0062048 A1* | 3/2006 | Gonzalez | G06F 11/106 |
| | | | 365/185.11 |
| 2006/0291304 A1 | 12/2006 | Rothman et al. | |

(Continued)

OTHER PUBLICATIONS

R. Ma, F. Wu, M. Zhang, Z. Lu, J. Wan and C. Xie, "RBER-Aware Lifetime Prediction Scheme for 3D-TLC NAND Flash Memory," in IEEE Access, vol. 7, pp. 44696-44708, 2019 (Year: 2019).*

(Continued)

*Primary Examiner* — Khoa D Doan
*Assistant Examiner* — Julian S Mendel
(74) *Attorney, Agent, or Firm* — Crowell & Moring LLP

(57) ABSTRACT

A data storage device tracks information about the ages and read counts of blocks of memory, which are indicative of data retention and read disturb issues, respectively. The data storage device uses a machine-learning model to predict which blocks in the memory are likely to contain errors based on the tracked information, and a read scrub operation is performed only on those blocks. Limiting the number of blocks that are read scrubbed reduces read amplification and reduces the time required for the read scrub process.

16 Claims, 7 Drawing Sheets

(56) References Cited

U.S. PATENT DOCUMENTS

| | | | | |
|---|---|---|---|---|
| 2014/0059405 | A1* | 2/2014 | Syu | G11C 16/04 711/E12.008 |
| 2014/0164824 | A1* | 6/2014 | Reche | G06F 11/076 714/6.13 |
| 2015/0348649 | A1* | 12/2015 | Yang | G11C 29/52 714/723 |
| 2016/0034194 | A1* | 2/2016 | Brokhman | G06F 12/0246 711/103 |
| 2016/0110249 | A1* | 4/2016 | Orme | G06F 11/1048 714/6.24 |
| 2016/0124679 | A1* | 5/2016 | Huang | G06F 12/0223 711/103 |
| 2018/0081917 | A1* | 3/2018 | Kishi | G06F 16/215 |
| 2018/0182465 | A1* | 6/2018 | Alhussien | G06F 11/1068 |
| 2019/0095299 | A1 | 3/2019 | Liu et al. | |
| 2020/0233604 | A1* | 7/2020 | Kazama | G06F 3/0659 |
| 2020/0249850 | A1* | 8/2020 | Klein | G06F 11/0751 |
| 2020/0364103 | A1* | 11/2020 | Sharifi Tehrani | G06F 11/0727 |
| 2021/0318833 | A1* | 10/2021 | Parker | G06F 3/0659 |
| 2022/0004456 | A1* | 1/2022 | Achtenberg | G11C 16/3404 |
| 2022/0011967 | A1* | 1/2022 | Mekhanik | G11C 29/50 |
| 2022/0066868 | A1* | 3/2022 | Betz | G06F 11/1068 |
| 2022/0231706 | A1* | 7/2022 | Wang | G11C 16/3495 |
| 2023/0031331 | A1* | 2/2023 | Alshawabkeh | G06F 11/3409 |
| 2023/0393756 | A1* | 12/2023 | Muchherla | G06F 3/0653 |

OTHER PUBLICATIONS

H. Choe, J. Jee, S.-C. Lim, S. M. Joe, I. H. Park and H. Park, "Machine-Learning-Based Read Reference Voltage Estimation for NAND Flash Memory Systems Without Knowledge of Retention Time," in IEEE Access, vol. 8, pp. 176416-176429, 2020 (Year: 2020).*

* cited by examiner

DATA STORAGE DEVICE AND METHOD FOR READ SCRUB WITH REDUCED READ AMPLIFICATION

CROSS-REFERENCE TO RELATED APPLICATION

This application claims priority to U.S. provisional patent application No. 63/450,422, filed Mar. 7, 2023, which is hereby incorporated by reference.

BACKGROUND

Data stored in a memory of a data storage device can be susceptible to corruption by ordinary read, program, and erase sequences. When the corruption is beyond the ability of an error correction code (ECC) algorithm to repair, data may be lost. To help prevent such data loss, a read scrub operation can be used to copy data from one block of memory to another, correcting any accumulated correctable errors in the process. In some data storage devices, read scrub operations are automatically performed at regular intervals (e.g., after a fixed number of read operations) to help ensure that the read scrub operation is performed before an uncorrectable error occurs. However, performing frequent copying operations can affect performance and life span of the memory. So, in other data storage devices, a targeted read scrub operation is used, wherein a read scrub operation is performed on only a portion of a targeted wordline at certain intervals (e.g., based on received host read commands).

DETAILED DESCRIPTION

The following embodiments generally relate to a data storage device and method for read scrub with reduced or even minimized read amplification. In one embodiment, a data storage device is provided comprising a memory comprising a plurality of blocks and a controller. The controller is configured to: track age and read count of each block of the plurality of blocks; determine a subset of the plurality of blocks that need to be read scrubbed based on the tracked ages and read counts of the plurality of blocks; and perform a read scrub operation on the subset of the plurality of blocks.

In another embodiment, a method is provided that is performed in a data storage device comprising a memory comprising a plurality of blocks. The method comprises: tracking age and read count of each block of the plurality of blocks; predicting which of the plurality of blocks are bad blocks based on the tracked ages and read counts; and read scrubbing the blocks that are predicted to be bad blocks.

In yet another embodiment, a data storage device is provided comprising: a memory comprising a plurality of memory areas; and means for: tracking age and read count of each memory area of the plurality of memory areas; analyzing the tracked ages and read counts of the plurality of memory areas to predict a subset of the plurality of memory areas that contain an error; and queuing the subset of the plurality of memory areas for read scrubbing.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
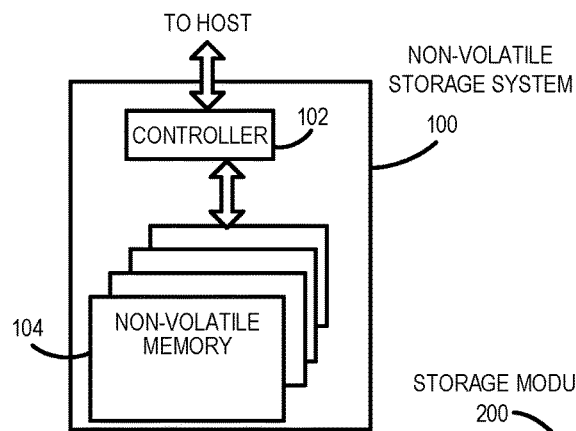
FIG. 1A is a block diagram of a data storage device of an embodiment.
Figure 1B:
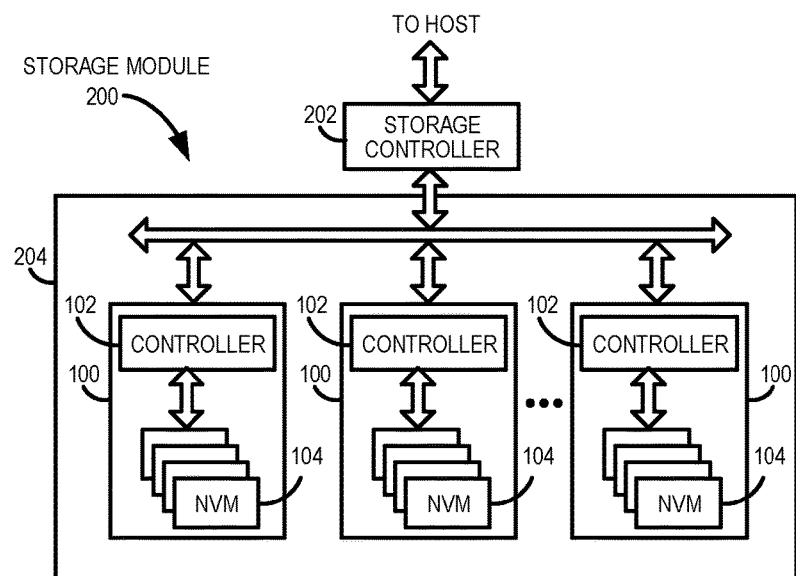
FIG. 1B is a block diagram illustrating a storage module of an embodiment.
Figure 1C:
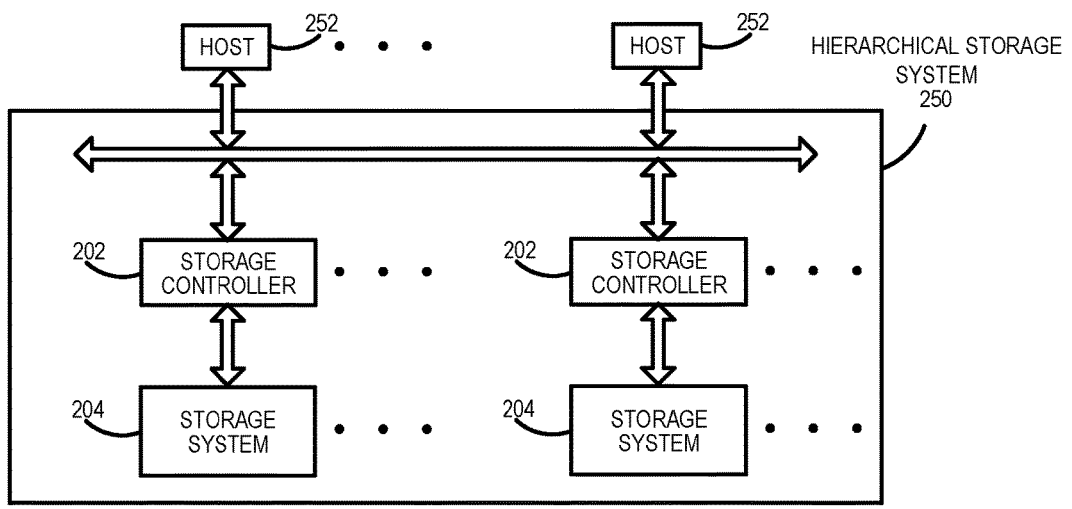
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
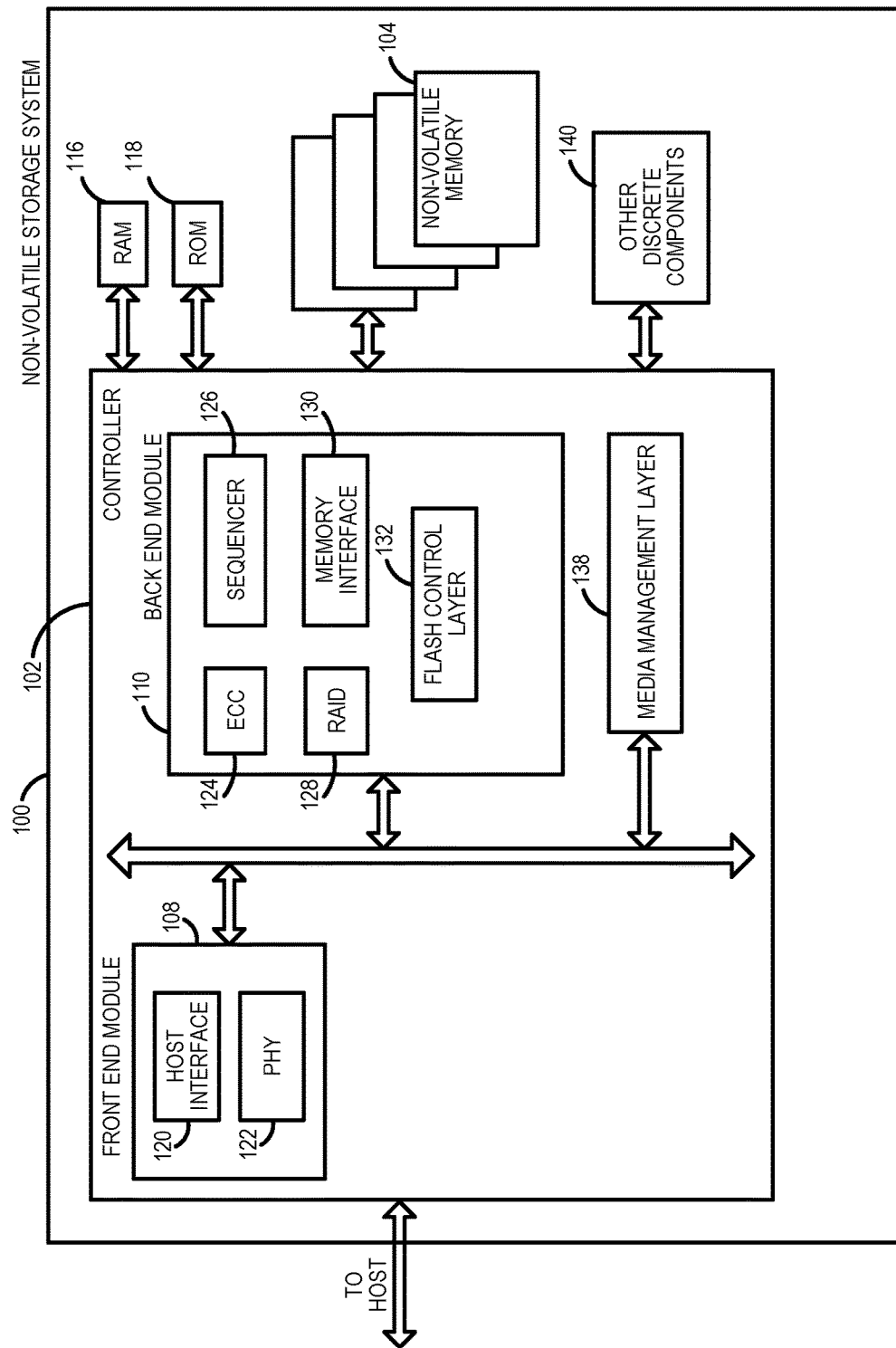
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
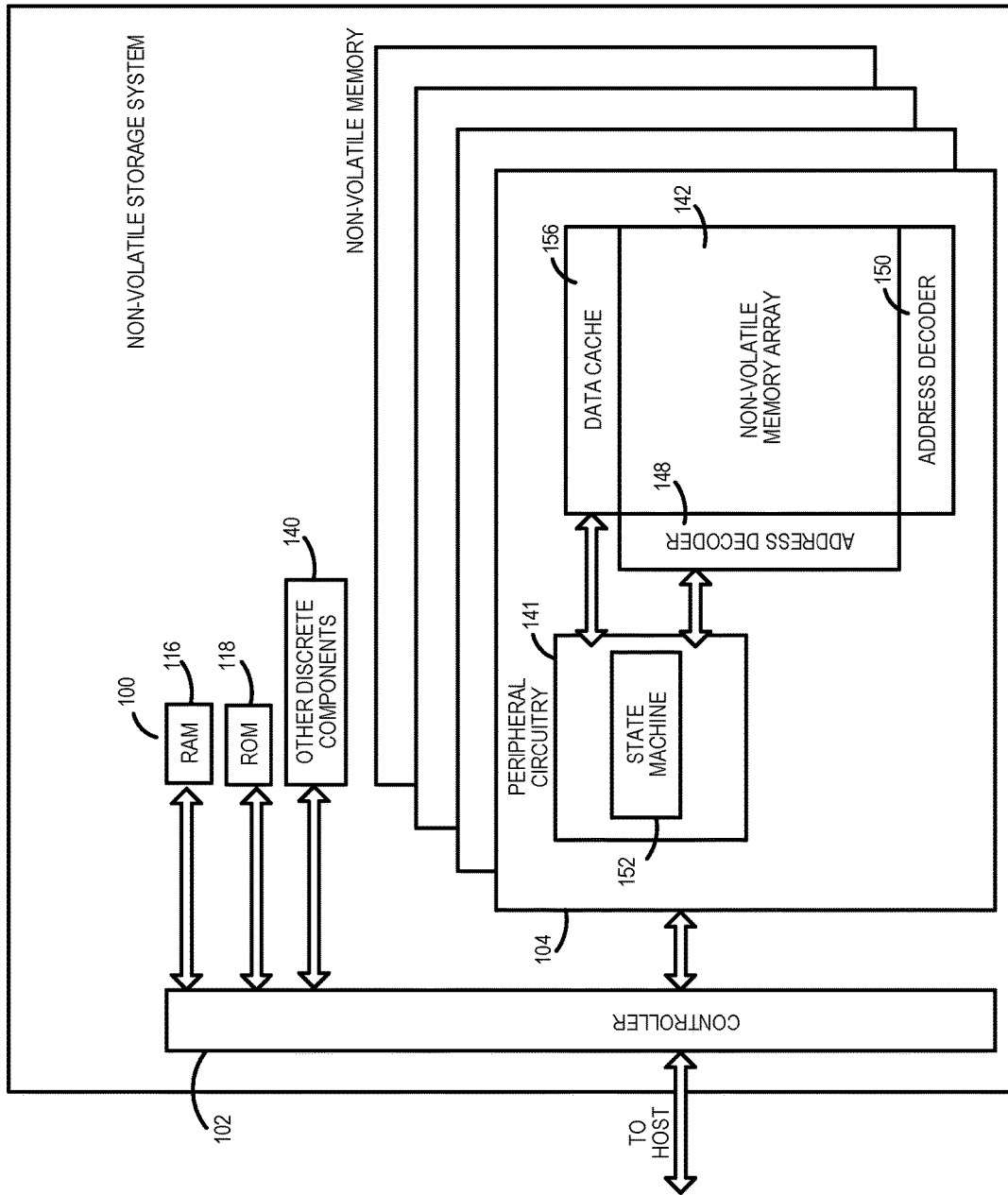
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. Peripheral circuitry 141 includes a state machine 152 that provides status information to the controller 102.

Returning again to FIG. 2A, the flash control layer 132 (which will be referred to herein as the flash translation layer (FTL) or, more generally, the "media translation layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
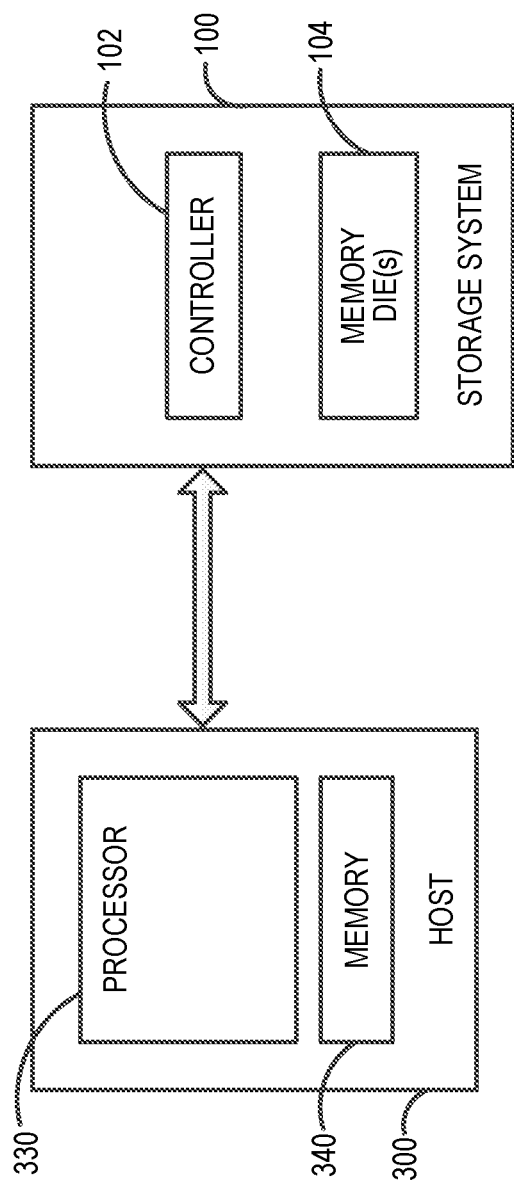
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, data stored in the memory can be susceptible to corruption by ordinary read, program, and erase sequences, where memory cells in physical proximity to those that are subject to a read, program, or erase action may be unintentionally stressed to the point where stored charge levels are altered enough such that bit errors are induced in those memory cells. With respect to read operations, read stress is induced not only on the wordline being read but also when the read voltage is applied to other wordlines in a physical memory block. The stress on wordlines not being read is sometimes referred to as a read disturb effect. If a block is being read unevenly, some pages may be corrupted without being read. Error correction codes (ECC) are typically implemented when storing and retrieving data in order to improve the chance that the data can be read from the memory without errors. When the corruption is beyond the ability of the ECC algorithm to repair, however, the data storage device may completely lose the data in those pages.

A read scrub operation can be used to address read disturb effects. In a read scrub operation, data is copied from one block to another block in the memory, so that the ECC algorithm used by the data storage device can attempt, during the copying process, to correct accumulated errors in the block. Preferably, a read scrub operation is performed before a block ends up with an uncorrectable errors. In some data storage devices, read scrub operations are automatically performed at regular intervals (e.g., after a fixed number of read operations, as tracked by a counter).

To avoid performing frequent and unnecessary copying operations that can affect performance and life span of the memory, a targeted read scrub operation can be used. In general, a targeted read scrub operation can involve a read scrub scan on only a portion of a targeted wordline in a block at desired intervals (e.g., based on a probabilistic determination that is calculated in response to each received host read command). The controller of the data storage device can place a block associated with the targeted wordline into a refresh queue if a number of errors detected in the targeted wordline meets or exceeds a predetermined threshold. The block refresh process can copy the data from the block into a new block during a background operation.

However, errors in data can be caused be factors other than the read disturb effect, such as a data retention failure. More specifically, a read disturb happens when a wordline in a block is repeatedly read before erasing the block. Hence, the number of bit-flips on a block due to read scrub is directly proportional to number of reads on that block. In contrast, a data retention failure refers to the situation in which bit-flips are directly proportional to the age of the block (i.e., the time since the programming started on the block), which can be measured, for example, by determining the number of blocks that have been opened for writing after the block in question was opened. So, the regular performance of read scrubbing operations on entire blocks may be desired to maintain the reliability of the memory in the face of all of these different factors. However, as noted above, frequent copying operations can affect performance and life span of the memory.

The following embodiments can be used to address this issue. In general, these embodiments can improve the "scan-hit-rate," which is defined as "the number of blocks queued for relocation due to errors in the scan" divided by "the number of blocks scanned." Improving the scan-hit-rate means doing a smaller number of scans to identify and relocate an error-prone block, which reduces read amplification due to the reduced number of scans.

In one embodiment, the controller 102 of the data storage device 100 estimates errors (i.e., bit-flips) using both age (e.g., as indicated by a block time stamp) and read count information and uses those factors as triggers to a read scrub operation, as those errors are directly proportional to data retention and read disturb, respectively. The controller 102 can keep track (e.g., in volatile memory, such as RAM 116) of read disturb and data retention failures for each block and identify (e.g., using a machine-learning model) likely-bad blocks (e.g., blocks with a certain number of errors) to be scanned based on read disturb and data retention failures. This limits the number of blocks scanned during read scrub, which reduces read amplification and reduces the time required for read scrub since fewer blocks are scanned. As will be explained in more detail below, a machine learning algorithm can be used to predict which blocks (or, more generally, memory areas) to read scrub based on tracked ages and read counts of the blocks.

Figure 4:
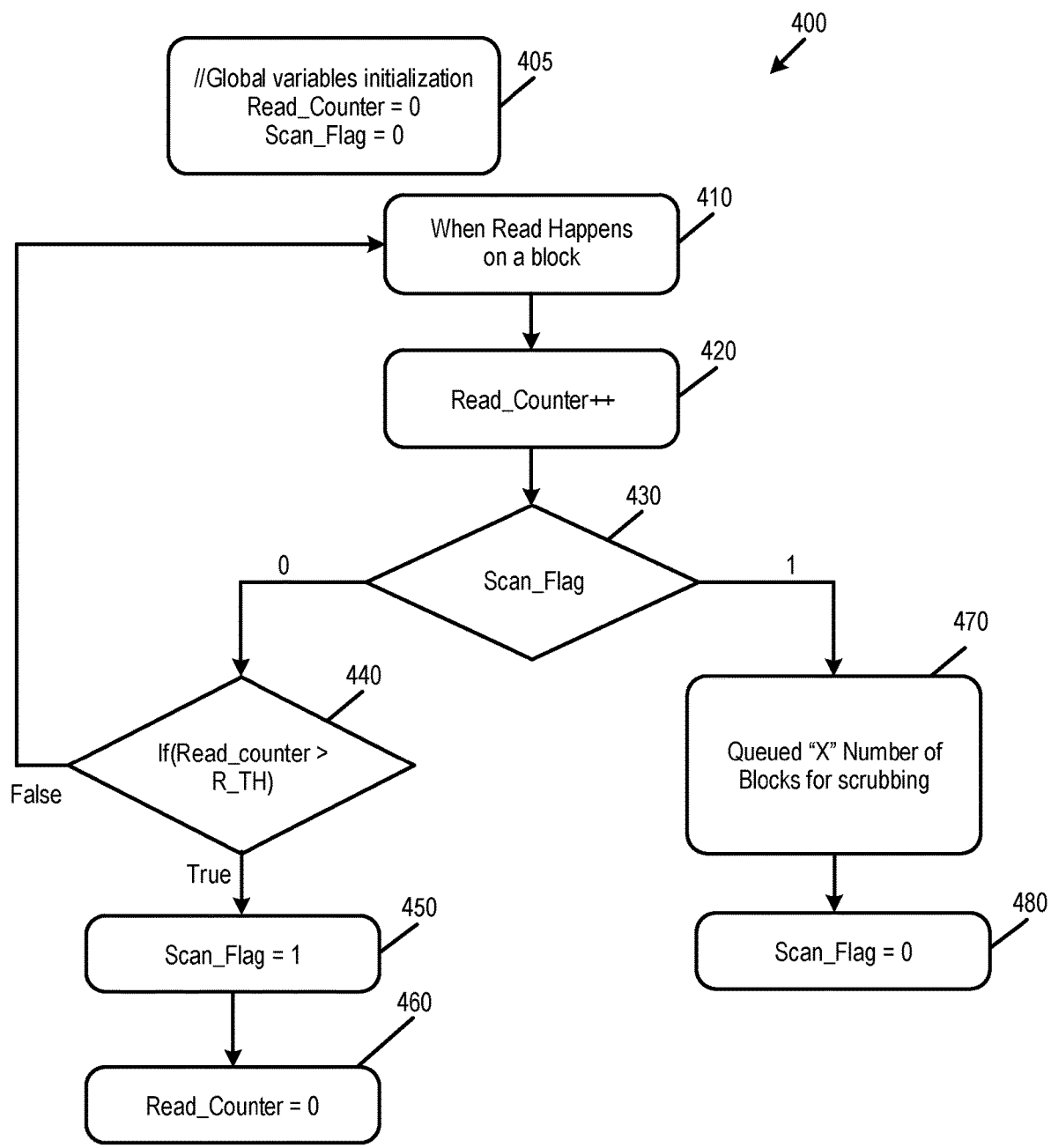
FIG. 4 is a flow chart of a method of an embodiment for setting and clearing a scan flag.

Turning again to the drawings, FIG. 4 is a flow chart 400 of a method of an embodiment for setting and clearing a scan flag used to indicate whether or not a given block should be queued for scanning/relocation. As shown in FIG. 4, initially, the read counter and scan flag for a block is set at zero (act 405). When a read happens on the block (act 410), the controller 102 increments the read counter (act 420) and then determines if the scan flag for the block is set at 0 or 1 (act 430). Initially, the scan flag is set at 0, meaning that the block is not designated for a read scrub operation. The controller 102 then determines if the read counter for the block is greater than a threshold (act 440). The threshold can be set to a number that is likely to cause a read disturb error in the block. If the read counter is not greater than the threshold, the method loops back to act 410. However, if the read counter is greater than the threshold, the scan flag is set to 1 (act 450), meaning that the block will be queued for a read scrub operation, and the read counter is reset to 0 (act 460). Going back to act 430, if the scan flag of the block is set at 1, when the number of blocks queued for scrubbing reaches a threshold ("X"), the read scrubbing operations are performed (act 470), after which the scan flag is reset to 0 (act 480).

Figure 5:
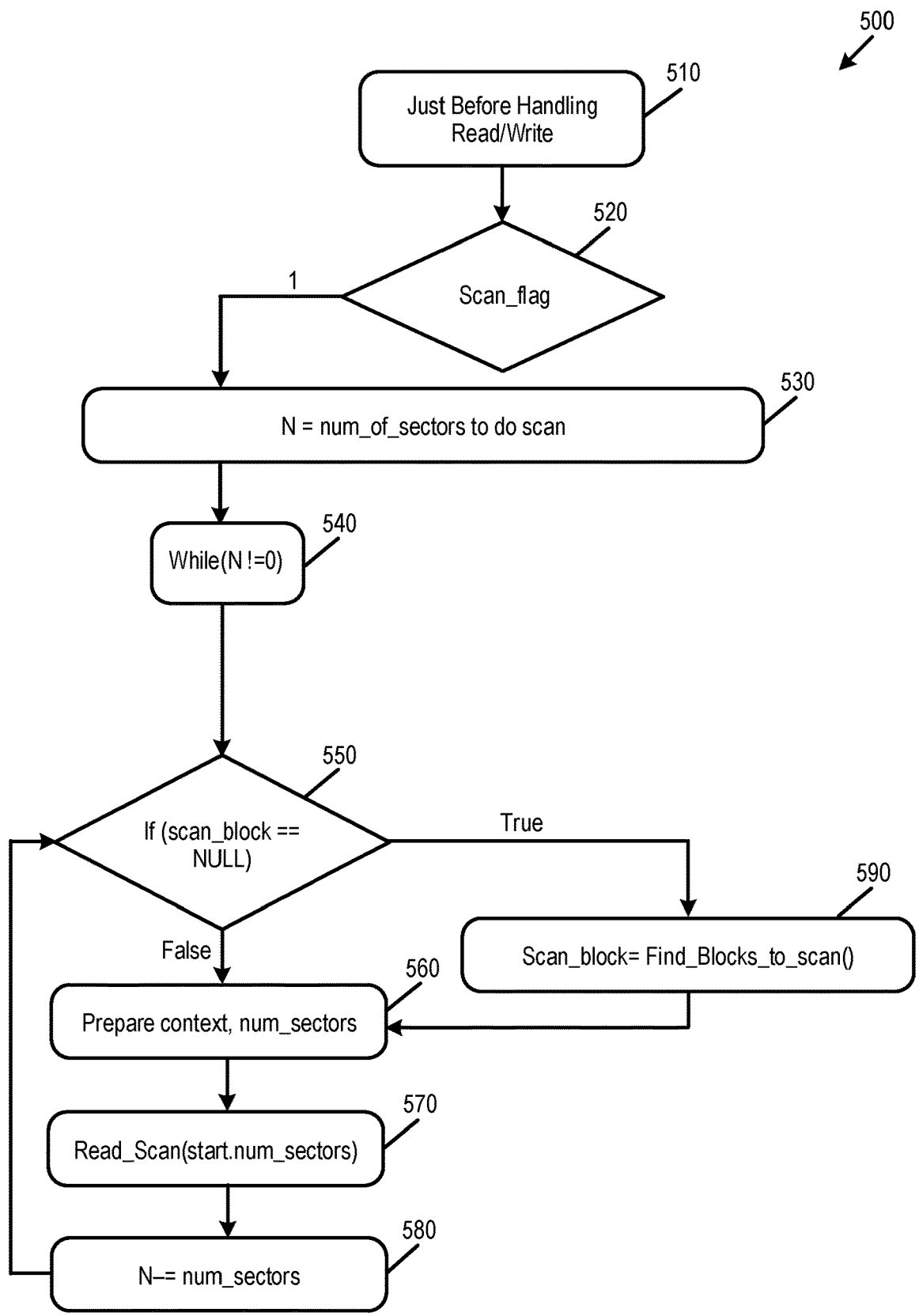
FIG. 5 is a flow chart of a method of an embodiment for scanning and queueing blocks for relocation.

FIG. 5 is a flow chart 500 of a method of an embodiment for scanning and queueing blocks for relocation. As shown in FIG. 5, just before handling a read/write operation (act 510), the controller 102 confirms that the scan flag is set to 1 (act 520) and then sets the number of sectors to scan in the block (act 530). While the number of blocks is not equal to 0 (act 540), the controller 102 determines if the scan block is null (act 550). If the scan block is not null, the controller 102 prepares the context and number of sectors (act 560), performs a read scan (act 570), and then decreases N by the number of sectors (act 580). However, if the scan block is null, the controller 102 finds blocks to scan (act 590).

In finding blocks to scan, the controller 102 can identify the block with the highest estimated bit-flips based on an equation from a machine learning regression. To train the machine learning equation, a target variable (Y) designates a number of bit-flips for a block, dependent variable (X1) designates a number of reads done on a block since a block was opened for programming, and dependent variable (X2) designates an age of a block (e.g., based on a number of blocks opened after this block). Since the estimation of Y is dependent on X1 and X2, as mentioned earlier, the controller 102 can store "NUM_READS" and "OPEN_TIME" in volatile memory for all blocks. So, whenever a read happens on a block, the controller 102 can increase "NUM_READS" and reset it to when the block is erased, as the retention and read disturb issues would be nullified after erase. When a new block is opened for writing, the controller 102 can update a global variable "Time_Stamp" and assign that value to "OPEN_TIME" of a block. The age of a block at any time will be "Time_Stamp-block.OPEN_TIME."

Machine learning algorithms/models, such as gradient descent, can be used to tune Y(X1,X2). This can be done by training the Y(X1,X2) model with offline error characterization data and using a static equation Y(X1,X2), or by training Y(X1,X2) with the run-time data samples collected when a scan happens (X1=block.NUM_READS, X2=block.OPEN_TIME-Time_Stamp, Y=number of bit flips while scanning).

Figure 6:
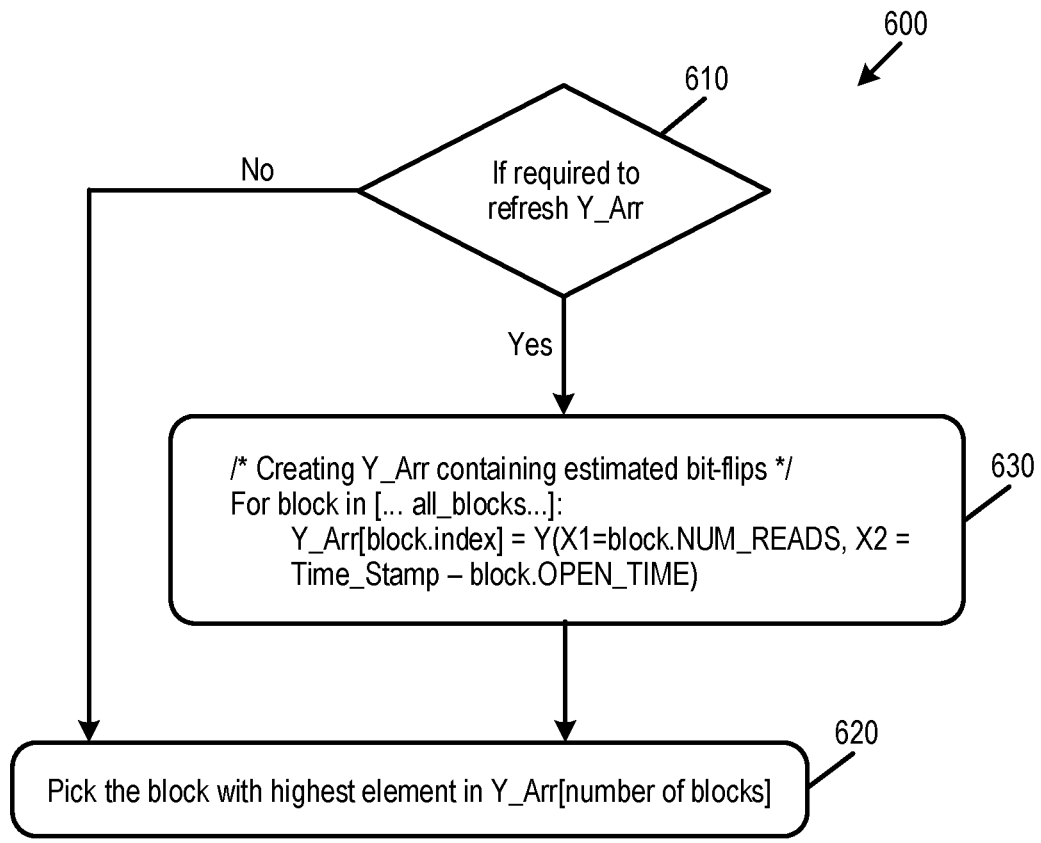
FIG. 6 is a flow chart of a method of an embodiment for finding blocks to scan.

FIG. 6 is a flow chart 600 of a method of an embodiment for finding blocks to scan. As shown in FIG. 6, the controller 102 first determines if the model needs to be refreshed (act 610). If the model does not need to be refreshed, the controller 102 picks the block with the highest estimated error (act 620). If the model needs to be refreshed, the controller 102 refreshes the model (act 630) and then picks the block with the highest estimated error (act 620).

The following is an illustration of the performance improvement that can be achieved using these embodiments. Existing read-scrub schemes may scan 1,000 blocks and queue 80 blocks to scrub because of high-bit-flips. In contrast, using these embodiments and assuming the prediction model is 80% accurate, the controller 102 can pick 100 blocks, and scanning those 100 blocks can result in 80 blocks with high-bit-flips. So, with respect to existing read-scrub schemes, these embodiments can achieve the same reliability but faster and improve performance by saving effort equivalent to scanning 900 blocks. The time to fetch the block using the equation Y(X1, X2) on all 1,000 blocks and selecting the block with the highest estimated "Y" takes time, but all of this data is in volatile memory. So, this scan is significantly faster than scanning hundreds of non-volatile memory blocks. Moreover, the algorithm of selecting ~100 blocks can be made better by just finding Y(X1,X2) for each block one-by-one and queuing a block if the estimated Y(X1,X2) for that block is higher than a defined threshold Y_TH (the controller 102 can stop queuing at 100 blocks).

There are many alternatives that can be used with these embodiments. For example, some blocks are inherently bad, and the bit-flips may not be due to read-disturb or data-retention issues. If this is ignored, the controller 102 may pick up wrong blocks that are not affected due to the mentioned errors. To handle this, the controller 102 can maintain an additional variable ("INHERENT_BIT_FLIPS") for every block, and the new Y is not just bit_flips during scan, but Y new=bit_flips-INHERENT_BIT_FLIPS. With this, the controller 102 can pick genuine blocks with bit-flips developed due to read-disturb and data-retention issues.

In another alternative, the machine learning model is expected to estimate the block with considerable accuracy because error-prone blocks are expected to have an expected age and read-count. However, in some cases, the controller 102 can miss picking a block with genuine bit-flips if the controller 102 is only scanning selected blocks obtained by the equation. So, when the read threshold (R_TH) is reached, the controller 102 can pick nearly 100 blocks and scan them. To handle this, the controller 102 can maintain a bit for every block that indicates whether that block was ever picked for scanning. Using that information, the controller 102 can scan the blocks that were not previously picked for scanning.

In yet another alternative, if the controller 102 picks 100 blocks from Y_Arr and if sorting 1,000 blocks and picking the first 100 blocks is too much effort for the controller 102, the controller 102 can decide to use a threshold Y_TH and simply scan the Y_Arr and queue a block to the "100 blocks" list if Y>Y_TH until the end of array is reached or until 100 blocks have been queued. This reduces the controller's effort. To increase accuracy of this algorithm, Y_TH can be correctly used after practically checking if the controller 102 generally ends up with 100 blocks with this threshold.

In yet another alternative, other variables can be independently handled or merged into the read scrub algorithm. For example, issues with temperature can be independently handled (e.g., by recording "data write" temperatures and comparing it with "data read" temperatures or some specific read-voltage level shifts).

There are several advantages associated with these embodiments. For example, these embodiments can improve read performance when performing a read scrub operation by estimating errors for a block before scanning the block in the read scrub process. These embodiments also provide advantages over a targeted read scan where some specific wordlines or blocks may be scanned upon a trigger from a certain read count or a read event, but data retention issues are not considered. Also, existing read scrub mechanisms scan the entire blocks to identify error-prone blocks, whereas these embodiments can avoid that scan by estimating the bit-flips using age and read count prior to scanning. These embodiments are also different from just keeping a threshold limit on the age of a block to avoid scanning all the blocks.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    a processor coupled with the memory and configured to:
        identify a plurality of blocks in the memory that may require a read scrub operation by tracking age and read count of each block of the plurality of blocks, wherein age and read count of a block are directly proportional to a likelihood of data retention errors and read disturb errors, respectively, in the block, and wherein each block in the plurality of blocks is identified by:
            incrementing a read counter when the block is read;
            determining whether a scan flag is set;
            in response to determining that the scan flag is not set:
                determining if the read counter for the block is greater than a read threshold; and
                in response to determining that the read counter for the block is greater than the read threshold:
                    set the scan flag; and
                    reset the read counter for the block; and
                in response to determining that the read counter for the block is not greater than the read threshold, continue tracking reads on the block; and
            in response to determining that the scan flag is set:
                queue the block for scrubbing; and
                reset the scan flag;
        train a machine learning $Y(X1,X2)$ model, wherein Y is a target variable that designates a number of bit-flips for a block, X1 is a dependent variable that designates a number of reads done on a block since a block was opened for programming, and X2 is a dependent variable that designates an age of a block;
        use the machine learning $Y(X1,X2)$ model to estimate a number of bit-flips in each of the plurality blocks based on the tracked ages and read counts of each of the plurality of blocks, wherein the ages are tracked based on time stamps created when each of the plurality of blocks was opened;
        determine whether the machine learning $Y(X1,X2)$ model needs to be refreshed;
        in response to determining that the machine learning $Y(X1,X2)$ model does not need to be refreshed, identify a subset of the plurality of blocks that have an estimated number of bit-flips above a threshold;
        in response to determining that the machine learning $Y(X1,X2)$ model needs to be refreshed, refresh the machine learning $Y(X1,X2)$ model before identifying the subset of the plurality of blocks that have the estimated number of bit-flips above the threshold, wherein the machine learning $Y(X1,X2)$ model is refreshed using offline error characterization data or using run-time data samples collected when a scan happens; and
        improve a scan-hit-rate by:
            instead of scanning all of the plurality of blocks, scanning only the subset of the plurality of blocks to determine which blocks of the subset of the plurality of blocks require the read scrub operation; and
            performing the read scrub operation only on the blocks of the subset of the plurality of blocks that are determined to require the read scrub operation;
            wherein the scan-hit-rate is improved by reducing a number of blocks that are scanned to find the blocks that require the read scrub operation.

2. The data storage device of claim 1, wherein the processor is further configured to track a number of inherent bit-flips in each block, and wherein the tracked number of inherent bit-flips is excluded from the estimated number of bit-flips.

3. The data storage device of claim 1, wherein the processor is further configured to identify blocks on which the read scrub operation has not been performed and perform the read scrub operation on the identified blocks.

4. The data storage device of claim 1, wherein the processor is further configured to stop using the machine learning model to estimate the number of bit-flips in response to the estimated number of bit-flips reaching a second threshold.

5. The data storage device of claim 1, wherein the processor is further configured to reset tracked age and read count of a block after performing the read scrub operation.

6. The data storage device of claim 1, wherein the processor is further configured to determine the blocks of the subset of the plurality of blocks by comparing a data-write temperature with a data-read temperature.

7. The data storage device of claim 1, further comprising a volatile memory, wherein the processor is further configured to store the tracked age and read counts in the volatile memory.

8. The data storage device of claim 1, wherein the memory comprises a three-dimensional memory.

9. The data storage device of claim 1, wherein the processor is further configured to determine the blocks of the subset of the plurality of blocks by comparing specific read-voltage level shifts.

10. In a data storage device comprising a memory comprising a plurality of blocks, a method comprising:
   identifying a plurality of blocks in the memory that may require a read scrub operation by tracking age and read count of each block of the plurality of blocks, wherein age and read count of a block are directly proportional to a likelihood of data retention errors and read disturb errors, respectively, in the block, and wherein each block in the plurality of blocks is identified by:
   incrementing a read counter when the block is read;
   determining whether a scan flag is set;
   in response to determining that the scan flag is not set:
      determining if the read counter for the block is greater than a read threshold; and
      in response to determining that the read counter for the block is greater than the read threshold:
         setting the scan flag; and
         resetting the read counter for the block; and
      in response to determining that the read counter for the block is not greater than the read threshold, continuing tracking reads on the block; and
   in response to determining that the scan flag is set:
      queuing the block for scrubbing; and
      resetting the scan flag;
   training a machine learning Y(X1,X2) model, wherein Y is a target variable that designates a number of bit-flips for a block, X1 is a dependent variable that designates a number of reads done on a block since a block was opened for programming, and X2 is a dependent variable that designates an age of a block;
   using the machine learning Y(X1,X2) model to estimate a number of bit-flips in each of the plurality blocks based on the tracked ages and read counts of each of the plurality of blocks, wherein the ages are tracked based on time stamps created when each of the plurality of blocks was opened;
   determining whether the machine learning Y(X1,X2) model needs to be refreshed;
   in response to determining that the machine learning Y(X1, X2) model does not need to be refreshed, identifying a subset of the plurality of blocks that have an estimated number of bit-flips above a threshold;
   in response to determining that the machine learning Y(X1 X2) model needs to be refreshed, refreshing the machine learning Y(X1,X2) model before identifying the subset of the plurality of blocks that have the estimated number of bit-flips above the threshold, wherein the machine learning Y(X1 X2) model is refreshed using offline error characterization data or using run-time data samples collected when a scan happens; and
   improving a scan-hit-rate by:
      instead of scanning all of the plurality of blocks, scanning only the subset of the plurality of blocks to determine which blocks of the subset of the plurality of blocks require the read scrub operation; and
      performing the read scrub operation only on the blocks of the subset of the plurality of blocks that are determined to require the read scrub operation;
      wherein the scan-hit-rate is improved by reducing a number of blocks that are scanned to find the blocks that require the read scrub operation.

11. The method of claim 10, further comprising identifying a block with a highest estimated number of bit flips.

12. The method of claim 10, further comprising excluding a tracked number of inherent bit-flips from the estimated number of bit-flips.

13. The method of claim 10, further comprising:
   identifying blocks that have not been read scrubbed; and
   read scrubbing the identified blocks.

14. The method of claim 10, further comprising stopping using the machine learning model to estimate the number of bit-flips in response to the estimated number of bit-flips reaching a second threshold.

15. The method of claim 10, further comprising queuing the blocks of the subset of the plurality of blocks prior to performing the read scrub operation.

16. A data storage device comprising:
   a memory comprising a plurality of memory areas; and
   means for:
      identifying a plurality of blocks in the memory that may require a read scrub operation by tracking age and read count of each block of the plurality of blocks, wherein age and read count of a block are directly proportional to a likelihood of data retention errors and read disturb errors, respectively, in the block, and wherein each block in the plurality of blocks is identified by:
      incrementing a read counter when the block is read;
      determining whether a scan flag is set;
      in response to determining that the scan flag is not set:
         determining if the read counter for the block is greater than a read threshold; and
         in response to determining that the read counter for the block is greater than the read threshold:
            setting the scan flag; and
            resetting the read counter for the block; and
         in response to determining that the read counter for the block is not greater than the read threshold, continuing tracking reads on the block; and
      in response to determining that the scan flag is set:
         queuing the block for scrubbing; and
         resetting the scan flag;
      training a machine learning Y(X1,X2) model, wherein Y is a target variable that designates a number of bit-flips for a block, X1 is a dependent variable that designates a number of reads done on a block since a block was opened for programming, and X2 is a dependent variable that designates an age of a block;
      using the machine learning Y(X1,X2) model to estimate a number of bit-flips in each of the plurality blocks based on the tracked ages and read counts of each of the plurality of blocks, wherein the ages are tracked based on time stamps created when each of the plurality of blocks was opened;

determining whether the machine learning Y(X1,X2) model needs to be refreshed;

in response to determining that the machine learning Y(X1,X2) model does not need to be refreshed, identifying a subset of the plurality of blocks that have an estimated number of bit-flips above a threshold;

in response to determining that the machine learning Y(X1 X2) model needs to be refreshed, refreshing the machine learning Y(X1,X2) model before identifying the subset of the plurality of blocks that have the estimated number of bit-flips above the threshold, wherein the machine learning Y(X1,X2) model is refreshed using offline error characterization data or using run-time data samples collected when a scan happens; and improving a scan-hit-rate by:
- instead of scanning all of the plurality of blocks, scanning only the subset of the plurality of blocks to determine which blocks of the subset of the plurality of blocks require the read scrub operation; and
- performing the read scrub operation only on the blocks of the subset of the plurality of blocks that are determined to require the read scrub operation;
- wherein the scan-hit-rate is improved by reducing a number of blocks that are scanned to find the blocks that require the read scrub operation.

* * * * *